(12) United States Patent
Oltman et al.

(10) Patent No.: US 8,985,145 B2
(45) Date of Patent: *Mar. 24, 2015

(54) COMBINATION FLOW CONTROL VALVE AND REVERSE FLOW CHECK VALVE

(71) Applicant: Snyder Industries, Inc., Lincoln, NE (US)

(72) Inventors: Darrell A. Oltman, Lincoln, NE (US); Larry D. Thomas, Beatrice, NE (US)

(73) Assignee: Snyder Industries, Inc., Lincoln, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/794,046

(22) Filed: Mar. 11, 2013

(65) Prior Publication Data

US 2014/0251474 A1 Sep. 11, 2014

(51) Int. Cl.
*F16K 15/18* (2006.01)

(52) U.S. Cl.
CPC .................................. *F16K 15/188* (2013.01)
USPC ..................... 137/614.2; 137/533.11; 251/144

(58) Field of Classification Search
USPC .............. 137/614.2, 519.5, 533.11, 613, 590, 137/592; 251/144
See application file for complete search history.

(56) References Cited

U.S. PATENT DOCUMENTS

| 36,238 | A | * | 8/1862 | Shaw ......................... 137/614.2 |
| 4,372,343 | A | | 2/1983 | Trinkwalder, Jr. |
| 5,595,217 | A | | 1/1997 | Gillen et al. |
| 5,673,896 | A | | 10/1997 | Gillen |
| 5,988,699 | A | | 11/1999 | Quandt |
| 6,050,545 | A | | 4/2000 | Stolzman |
| 6,056,012 | A | | 5/2000 | Yuen et al. |
| 6,499,721 | B2 | | 12/2002 | Stolzman et al. |
| 6,550,495 | B1 | | 4/2003 | Schulze |
| 6,619,316 | B2 | | 9/2003 | Wiechers et al. |
| 6,945,273 | B2 | | 9/2005 | Reid |
| 6,971,633 | B2 | | 12/2005 | Gillen |
| 7,100,637 | B1 | * | 9/2006 | Ball ........................... 137/614.2 |
| 7,743,786 | B2 | | 6/2010 | Madama et al. |
| 8,312,889 | B2 | | 11/2012 | Oltman et al. |
| 8,561,642 | B2 | * | 10/2013 | Schutz ....................... 137/614.2 |

* cited by examiner

*Primary Examiner* — Kevin Lee
(74) *Attorney, Agent, or Firm* — Hovey Williams LLP

(57) ABSTRACT

A combination flow control and reverse flow check valve controls the flow of fluid in a desired downstream direction and limits undesired backflow of liquid in an upstream direction into a fluid source such as a reservoir. The flow control and reverse flow check valve may include a housing having a fluid conveying channel with an upstream end configured for mounting to the liquid source and a downstream end for discharging fluids, a flow control valve positioned between the ends, and a check element positioned in the channel between the flow control valve and the downstream end. The check element is advantageously positioned between the flow control valve and the downstream end of the housing to prevent possible contaminants in a backflow liquid from reaching the flow control valve.

18 Claims, 4 Drawing Sheets

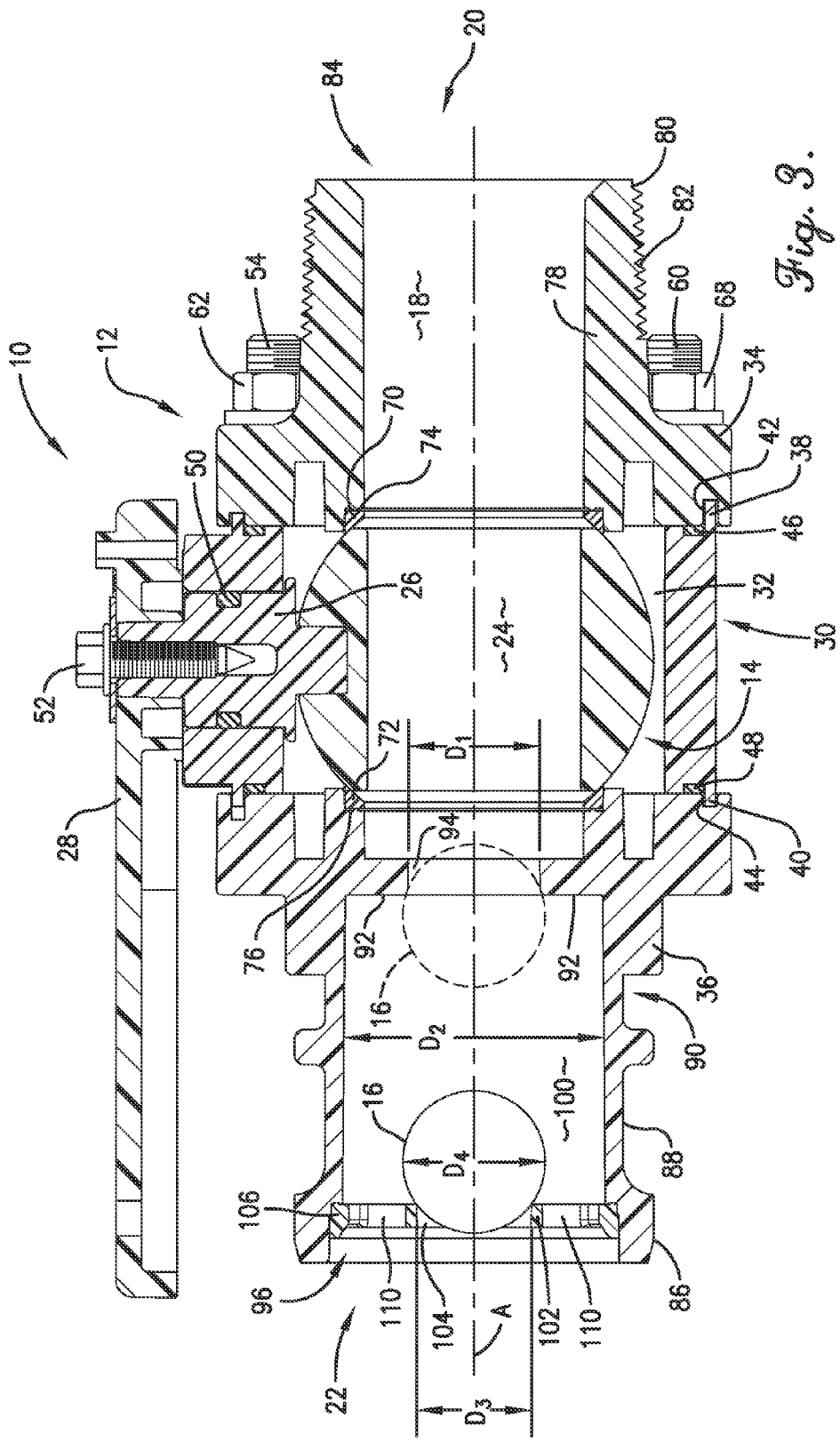

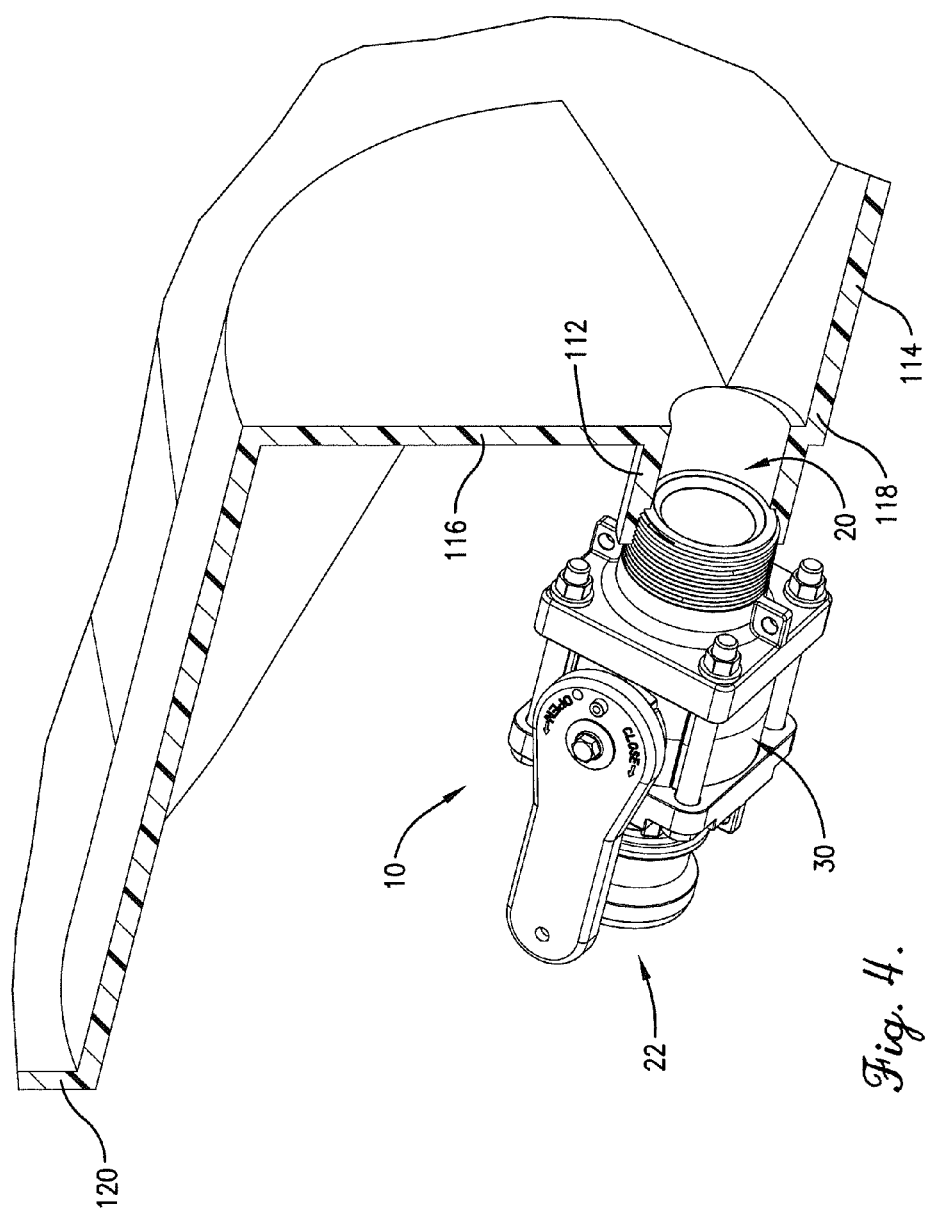

COMBINATION FLOW CONTROL VALVE AND REVERSE FLOW CHECK VALVE

BACKGROUND

1. Field of the Invention

The present invention relates to flow control valves and reverse flow check valves.

2. Description of Related Art

Liquid handling systems are typically provided with valves to control the flow of liquids through the systems. Those valves may be gate valves, ball valves or other types of controllable valves whereby an operator may manually regulate the flow of liquid through the systems.

In many such systems, the valves are placed in confined locations and therefore must be compact in size. In some instances, such as sanitary systems or in chemical applications where some chemicals may be reactive with others, it is necessary to avoid reverse flow (also called backflow) of the liquid. That is, it may be desirable or essential that the liquid flow in one direction only so as not to contaminate an upstream source of liquids. Furthermore, any connection of components within the liquid handling systems presents a potential for leaks, whereby liquid may leak from a valve, pipe or fitting. There has thus developed a need for a compact valve which meets these demands.

SUMMARY OF THE INVENTION

These and other objects have largely been met by embodiments of a combination flow control valve and reverse flow check valve constructed in accordance with embodiments of the present invention. Embodiments of the invention provide a unique, compact combination valve for use in applications where size restrictions or considerations of leakage, contamination, or cost would not permit or recommend the use of separate valves.

A combination flow control valve and reverse flow check valve constructed in accordance with embodiments of the present invention broadly includes a housing defining a central, liquid conveying channel therethrough, a shiftable flow control valve element positioned within the housing for controlling the flow of liquid through the channel, and a check element positioned within the housing for preventing backflow of liquid through the channel. The combination valve may be attached to and control the flow of liquids from a container, tank, reservoir, or any other source of fluids.

Embodiments of the combination valve permit selective control of liquid flow in a downstream direction. To restrict or stop such flow, the shiftable valve element can be moved to partially or fully close the channel. However, when the shiftable valve element is in a position to at least partially permit flow of liquid through the combination valve, there may be occasions where reverse flow is encountered. In this instance, the reverse flow of the liquid within the channel causes the check element to seal against the flow of liquid in an undesired upstream direction toward the fluid source to which the combination valve is attached. As a result, the combination valve is beneficially designed to selectively permit the flow of liquid therethrough in a downstream direction, but prevents or at least inhibits the flow of liquid in an upstream direction.

Applicant has discovered that the positioning of the check element relative to the flow control valve is critical in some applications to prevent possible fouling of the flow control valve and migration of backflow liquid into a reservoir or other fluid source to which the combination valve is attached. Specifically, if the check element is positioned upstream of the fluid control valve with respect to the desired direction of fluid flow, backflow liquids may reach and flow past the flow control valve in a backflow situation, thus contaminating the flow control valve and possibly migrating into the reservoir or other fluid source.

Embodiments of the present invention solve the above-described problem by advantageously positioning the check element downstream of the flow control valve. This permits the check element to contain backflow liquids near a downstream end of the combination valve to prevent possible contaminants in the backflow liquid from reaching the flow control valve in a backflow situation.

These and other advantages will be readily apparent to those skilled in the art with reference to the drawings and detailed description thereof. This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

Embodiments of the present invention are described in detail below with reference to the attached drawing figures, wherein:

FIG. 3 is a vertical cross-sectional view of the combination flow control valve and reverse flow check valve of FIG. 1 showing the flow control valve in an open position, the check element in solid lines in an open position, and the check element in dashed lines in a closed backflow preventing position.

FIG. 4 is a fragmentary perspective view of the combination flow control valve and reverse flow check valve shown mounted to a tubulation of a reservoir, the reservoir being shown in vertical cross-section through the tubulation.

Figure 1:
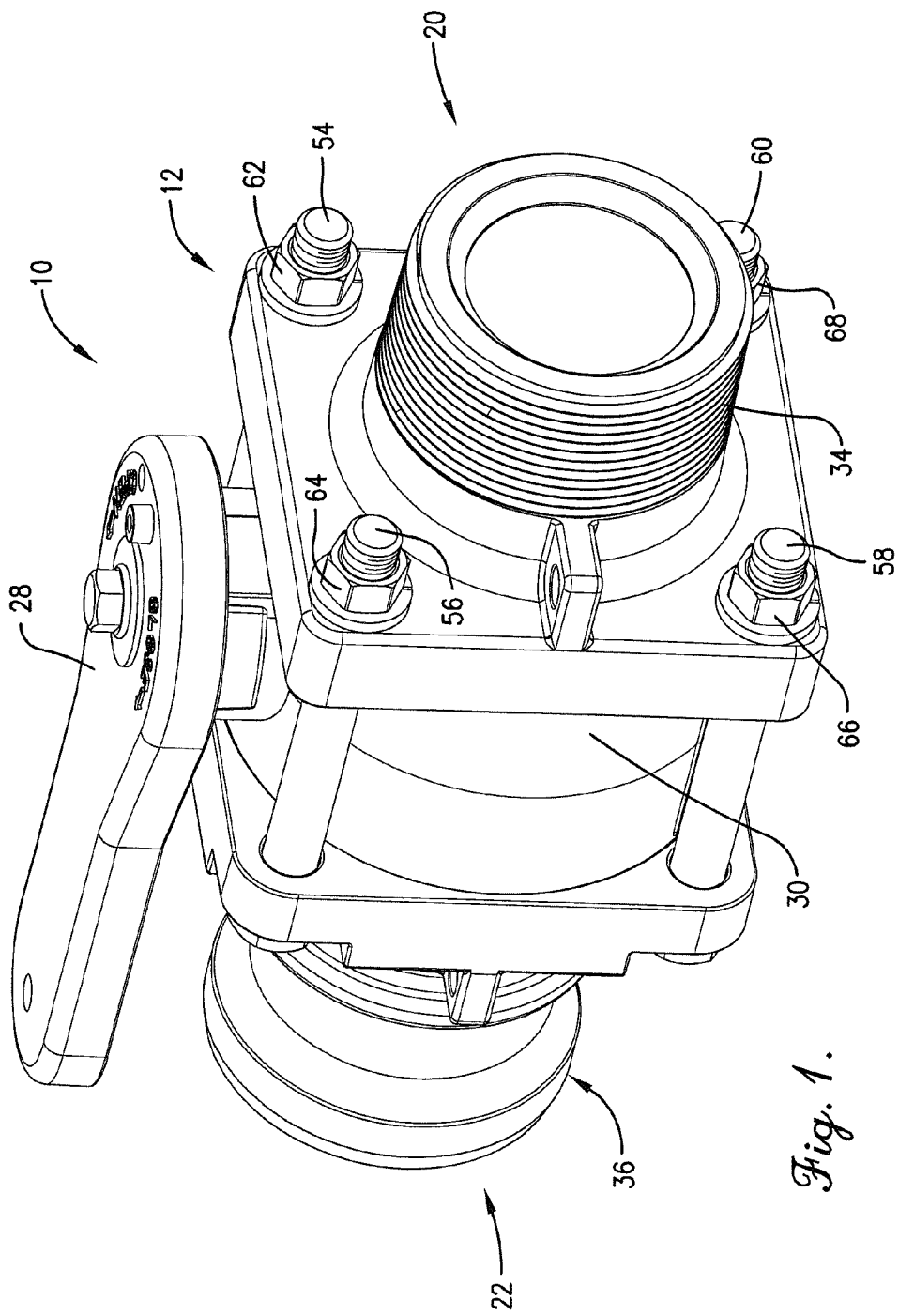
FIG. 1 is a top rear isometric view of a combination flow control valve and reverse flow check valve constructed in accordance with embodiments of the present invention, showing a handle operatively connected to a flow control valve in an open position.

The drawing figures do not limit the present invention to the specific embodiments disclosed and described herein. The drawings are not necessarily to scale, emphasis instead being placed upon clearly illustrating the principles of the invention.

DETAILED DESCRIPTION OF EMBODIMENTS OF THE INVENTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Referring now to the drawing figures, a combination flow control valve and reverse flow check valve 10 constructed in accordance with embodiments of the invention broadly is illustrated. The combination flow control valve and reverse flow check valve 10 is also referred to herein as a "combination valve". As explained below, the combination valve 10 may be attached to and used to regulate the flow of liquids from a tank, container, reservoir, or any other source of fluid.

As best illustrated in FIG. 3, an embodiment of the combination valve 10 broadly includes a housing 12, a flow control valve 14, and a check element 16. The components of the combination valve 10 may be formed of any suitable materials such as polymers or metal and may be of any size and shape.

The housing 12 defines a central, fluid conveying channel 18 extending longitudinally therethrough and has a central axis A. Fluid normally flows though the channel 18 from an upstream end 20 to a downstream end 22 of the combination valve. For example, fluid may flow out of a tank, container, or reservoir into the upstream end 20 and out the downstream end 22.

The flow control valve 14 may be shiftable between open and closed positions, as well as partially open positions. The flow control valve is shown in its open position in FIG. 3. In one embodiment, the flow control valve is configured as a ball valve having a generally spherical outer surface with a generally cylindrical bore 24 therethrough. Although it will be appreciated that the present invention is also effective when other flow control valves, such as for example gate valves, globe valves and butterfly valves may also be used as flow control valves in the present invention.

The flow control valve 14 is coupled with a stem 26, which extends through the housing 12 and receives thereon a handle 28 for rotatably shifting the flow control valve 14 within the housing 12. The handle 28 may be operated to position the bore 24 in alignment and fluid communication with the channel 18 as shown in FIG. 3 or alternately turned to position the bore 24 so that the flow control valve partially or completely blocks the flow of liquid through the valve 10.

Referring primarily to FIG. 3, embodiments of the housing 12 will now be described in more detail. The housing 12 has a central body 30 having a chamber 32 for receiving the flow control valve 14. The housing 12 also includes an upstream end body 34 for coupling with a reservoir or other source of fluid and a downstream end body 36 for receiving the check element 16.

The central body 30 is provided with circular, longitudinally extending flanges 38 and 40 which are received in corresponding circular grooves 42 and 44 of the upstream end body 34 and the downstream end body 36. O-rings, gaskets, or other seals 46, 48 are positioned adjacent the flanges 38, 40 to help seal the valve against leakage.

The stem 26 extends through the central body 30 in a direction generally perpendicular to the longitudinal axis of the channel 18 so that the flow control valve 14 may rotate about an axis perpendicular to the longitudinal axis of the channel. An O ring 50 helps to seal the valve stem 26 and the central body 30. An interior portion of the stem 26 is received in a recess or socket of the flow control valve 14 as shown in FIG. 3 to engage and rotate the valve 14 within the chamber 32. The handle 28 is coupled by a bolt 52 or other fastener threadably attached to the valve stem 26 for applying a rotational force to the valve stem to turn (typically a ¼ turn) the flow control valve 14 within the central body 30.

The central body 30, the upstream end body 34, and the downstream end body 36 are held together by four bolts 54, 56, 68 and 60, and secured by corresponding nuts 62, 64, 66 and 68. Seals 70 and 72 are received in recesses 74 and 76 for sealing the flow control valve 14 against leakage. Tightening of the nuts onto their respective bolts provides the sealing engagement of the seals 70 and 72 with the flow control valve 14.

The upstream end body 34 is positioned on the normally upstream side 20 of the central body 30 and the flow control valve 14 and includes a tubular extension 78 having an outer surface 80 which is provided with external threads 82. An opening 84 in the upstream end of the tubular extension provides for the entry of liquid into the combination valve 10.

The downstream end body 36 is positioned on the normally downstream side 22 of the central body 30 and the flow control valve 14 and thus opposite the upstream end body 34. The downstream end body 36 has an outer surface 86 including one or more circumscribing grooves 88, 90 configured and adapted for enabling a coupler of a pipe, tank or other component of a fluid handling system to mount thereon. Other suitable fittings such as threaded attachments could be used instead of the grooves 88, 90.

The downstream body 36 also has a circumferentially-extending shoulder 92 that extends radially inwardly in the channel 18 on the downstream side of the flow control valve 14. The shoulder 92 defines a substantially circular opening 94 through which fluid passing through the flow control valve 14 may pass. The opening 94 also provides a seat for the check element 16 as described below. The opening 94 and thus the seat has a diameter D1.

The downstream body 36 also has an opening 96 on its downstream end for discharging liquid from the combination valve 10. A retainer 98 is positioned in the opening, the purpose of which is described below. Together, the shoulder 92 and the retainer 98 define a chamber 100 in the downstream body 36 in which the check element 16 is positioned and moves. The chamber has a diameter D2.

Figure 2:
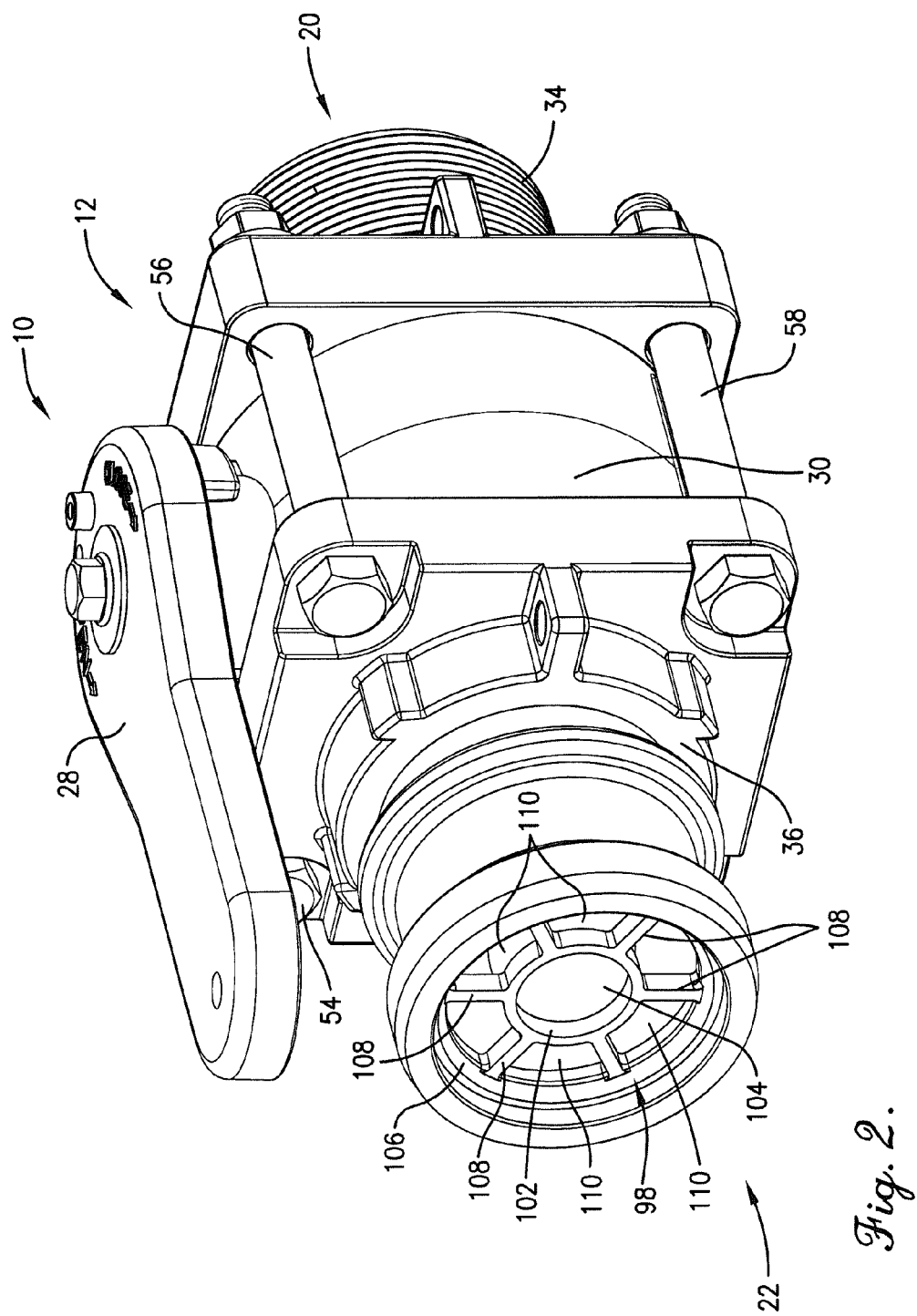
FIG. 2 is a top front isometric view of the combination flow control valve and reverse flow check valve of FIG. 1 shown with its flow control valve in an open position.

The retainer 98 will now be described in more detail with reference to FIGS. 2 and 3. The retainer 98 is sonic welded or otherwise attached within the opening 96 of the downstream body 36 and maintains the check element 16 in the chamber 100 and permits fluids to flow past the check element 16 and out the opening 96. An embodiment of the retainer 98 includes an inner circular-shaped hub 102 defining a central opening 104 having an inside diameter D3. The opening 104 serves as a seat for the check element 16 when liquids are flowing through the combination valve 10 in a desired downstream direction and permits fluids into the chamber 100 in a backflow situation to push the check element 16 against the opening 94. The retainer 98 further includes an outer circular-shaped hub 106 and a plurality of ribs 108 extending radially outwardly from the inner hub 102 to the outer hub 106 and defining a plurality of outer openings 110. The outer openings 110 permit substantially uninterrupted flow of fluid through the channel 18 in the desired direction of flow of liquid even when the check element 16 is blocking the central opening 104 in the retainer 98.

The check element 16 moves within the chamber 100 of the downstream body 36 between an open position shown in solid lines in which fluids flow through the combination valve 10 in a desired downstream direction and a closed, backflow-preventing position shown in dashed lines in which the check element 16 prevents liquids from back flowing in a reverse direction through the flow control valve 14. An embodiment of the check element 16 is a spherical ball having a diameter D4. D4 is greater than D1 and D3 so that the check element 16 is always retained in the chamber 100 but less than D2 to permit fluid to pass around the check element 16 and out the openings 110 in the retainer 98.

FIG. 4 illustrates the combination valve 10 mounted to a tubulation 112 of a tank, container, or other reservoir 114. An embodiment of the reservoir 114 is rotationally molded of synthetic resin such as high density polyethylene (HDPE) and shown as an intermediate bulk container (IBC). However, the reservoir may be constructed of other materials and in other configurations without departing from the scope of the present invention.

As shown in FIG. 4, the tubulation 112 is shown as an integrally molded, unitary component near the bottom wall of the reservoir 114 for gravity drainage. Such reservoirs 114 also include a top wall having a fill access or opening near the top of the reservoir, so that filling of the liquid contents of the reservoir is to be accomplished through a different opening than the tubulation 112 which is used as a fluid outlet. The tubulation 112 typically extends somewhat from a side wall 116 of a bottom outlet plenum 118 so as to be laterally recessed with respect to the side wall 120 of the main part of the reservoir 114. The tubulation 112 may be internally threaded at least along a part of its length so as to threadably receive the threads 82 of the upstream body 34 or be otherwise complementally configured to mount the tubular extension 78 within the tubulation 130.

Use of the combination valve 10 will now be summarized with reference to FIG. 3. The flow control valve 14 is shown in its "open" position to permit liquid to flow from the upstream end 20 of the combination valve and out the downstream end 22 of the valve. When it is desired to reduce or stop the flow of liquid through the combination valve 10, the handle 28 may be rotated from the position shown in the figures.

Normally, fluid flow is in a direction from upstream to downstream, shown as right to left as depicted in the drawing figures. In normal fluid flow, the flow of liquid passes through the flow control valve 14, enters the chamber 100, and causes the check element 16 to press against the retainer 98 as shown in solid lines in FIG. 3. However, instances may occur where back pressure or the like causes liquid to flow from the downstream end 22 toward the upstream end 20 of the valve, i.e. left to right in the drawing figures. The present invention permits the same combination valve 10 to both control the flow of liquid and to prevent such reverse flow.

When such reverse flow occurs, the reverse flow of liquid causes the check element 16 to move from its normal position in the chamber 100 shown in solid lines to the position shown in broken lines in FIG. 3. In this position, the check element 16 is moved against the shoulder 92 to block the opening 94. The force of the liquid against the check element 16 seals the opening 94 and ensures that the liquid cannot pass to the flow control 14 valve in an upstream direction. By advantageously positioning the check element 16 downstream of the flow control valve 14, the check element 16 contains backflow liquids in the chamber 100 near a downstream end 22 of the combination valve 10 to prevent possible contaminants in the backflow liquid from reaching the flow control valve 14 in a backflow situation.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A combination flow control valve and reverse flow check valve comprising:
   a housing defining a central, fluid conveying channel therethrough, wherein the channel extends longitudinally along an axis from a desired upstream opening end to a desired downstream outlet end, wherein said housing includes a circumferentially-extending shoulder extending radially inwardly in the channel between an shiftable valve element and an check element, the shoulder defining a substantially circular opening presenting a seat for the check element, the seat having a first diameter;
   the shiftable valve element positioned within the housing for controlling the flow of liquid through the channel;
   the check element positioned within the housing in a downstream position relative to the shiftable valve element in regard to a desired direction of flow for inhibiting backflow of liquid through the channel and past the shiftable valve element; and
   a check element retainer located proximate the desired downstream end of the housing and positioned in the channel for maintaining the check element in the housing.

2. The combination flow control valve and reverse flow check valve as set forth in claim 1, wherein the check element retainer includes an inner circular-shaped hub defining a central opening presenting a second diameter.

3. The combination flow control valve and reverse flow check valve as set forth in claim 2, wherein the check element has a third diameter which is greater than the first and second diameters.

4. The combination flow control valve and reverse flow check valve as set forth in claim 3, wherein the housing has a chamber between the shoulder and the retainer, the chamber having a fourth diameter greater than the third diameter.

5. The combination flow control valve and reverse flow check valve as set forth in claim 2, wherein the check element further includes a plurality of ribs extending radially outwardly from the inner hub and defining a plurality of outer openings, wherein the outer openings permit substantially uninterrupted flow of fluid through the channel in the desired direction of flow.

6. A combination flow control valve and reverse flow check valve as set forth in claim 1, wherein the housing is substantially unitary.

7. A combination flow control valve and reverse flow check valve comprising:
   a housing defining a central, fluid conveying channel therethrough, wherein the channel extends longitudinally along an axis from a desired upstream opening end to a desired downstream outlet end;
   a shiftable valve element positioned within the housing for controlling the flow of liquid through the channel; and
   a check element positioned within the housing in a downstream position relative to the shiftable valve element in regard to a desired direction of flow for inhibiting backflow of liquid through the channel and past the shiftable valve element, wherein said check element is substantially spherical.

8. A combination flow control valve and reverse flow check valve comprising:
a housing defining a central, fluid conveying channel therethrough, wherein the channel extends longitudinally along an axis from a desired upstream opening end to a desired downstream outlet end, the housing including a circumferentially-extending shoulder extending radially inwardly in the channel, the shoulder defining a substantially circular opening presenting a seat, the seat having a first diameter;
a shiftable valve element positioned within the housing for controlling the flow of liquid through the channel;
a spherical check element positioned within the housing in a downstream position relative to the shiftable valve element in regard to a desired direction of flow and configured for engaging the seat for inhibiting backflow of liquid through the channel and past the shiftable valve element; and
a check element retainer located proximate the desired downstream outlet end of the housing and positioned in the channel for maintaining the spherical check element in the housing.

9. The combination flow control valve and reverse flow check valve as set forth in claim 8, wherein the check element retainer includes an inner circular-shaped hub defining a central opening presenting a second diameter.

10. The combination flow control valve and reverse flow check valve as set forth in claim 9, wherein the spherical check element has a third diameter which is greater than the first and second diameters.

11. The combination flow control valve and reverse flow check valve as set forth in claim 10, wherein the housing has a chamber between the shoulder and the retainer, the chamber having a fourth diameter greater than the third diameter.

12. The combination flow control valve and reverse flow check valve as set forth in claim 9, wherein the check element retainer further includes a plurality of ribs extending radially outwardly from the inner hub and defining a plurality of outer openings, wherein the outer openings permit substantially uninterrupted flow of fluid through the channel in the desired direction of flow.

13. A reservoir for holding fluid, the reservoir comprising:
a tubulation adapted to discharge fluid from the reservoir; and
a combination flow control valve and reverse flow check valve mounted to the tubulation, the combination flow control and reverse flow check valve including:
a housing defining a central, fluid conveying channel therethrough, wherein the channel extends longitudinally along an axis from a desired upstream opening end to a desired downstream outlet end;
a shiftable valve element positioned within the housing for controlling the flow of liquid through the channel; and
a check element positioned within the housing in a downstream position relative to the shiftable valve element in regard to a desired direction of flow for inhibiting backflow of liquid through the channel and past the shiftable valve element.

14. The reservoir as set forth in claim 13, wherein the housing of the combination flow control and reverse flow check valve includes a circumferentially-extending shoulder extending radially inwardly in the channel between the shiftable valve element and the check element, the shoulder defining a substantially circular opening presenting a seat for the check element, the seat having a first diameter.

15. The reservoir as set forth in claim 14, the combination flow control valve and reverse flow check valve further including a check element retainer located proximate the desired downstream end of the housing and positioned in the channel for maintaining the check element in the housing.

16. The reservoir as set forth in claim 15, wherein the check element retainer includes an inner circular-shaped hub defining a central opening presenting a second diameter.

17. The reservoir as set forth in claim 16, wherein the check element has a third diameter which is greater than the first and second diameters.

18. The reservoir as set forth in claim 17, wherein the housing has a chamber between the shoulder and the retainer, the chamber having a fourth diameter greater than the third diameter.

* * * * *